June 27, 1967 A. STEWART ETAL 3,327,971
MOUNTING ARRANGEMENT FOR LIFT ENGINES
Filed June 14, 1965 2 Sheets-Sheet 1
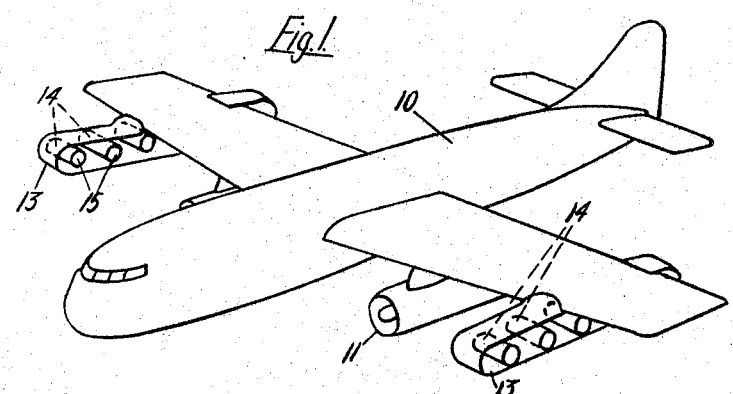
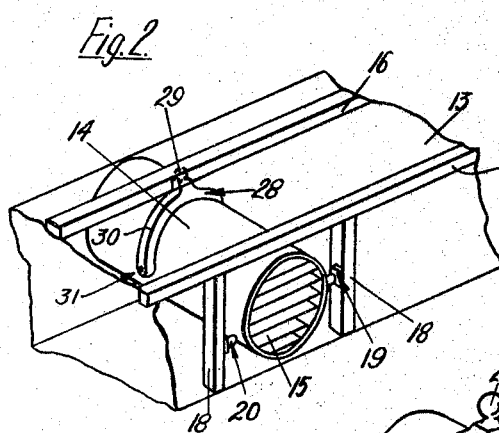
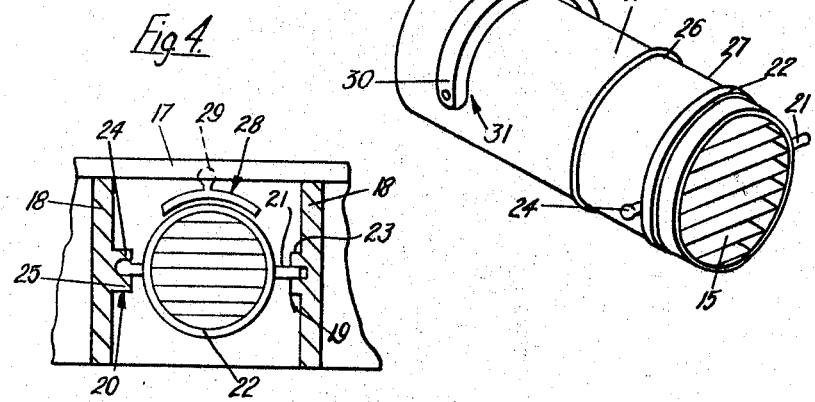
Inventors
Alexander Stewart
Roger Anthony Cresswell
Martin Hume Bryan-Brown
by Cushman, Darby & Cushman
Attorneys

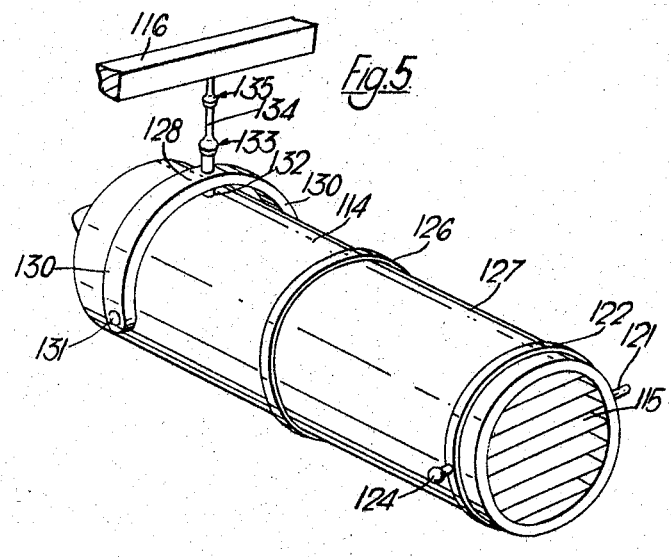
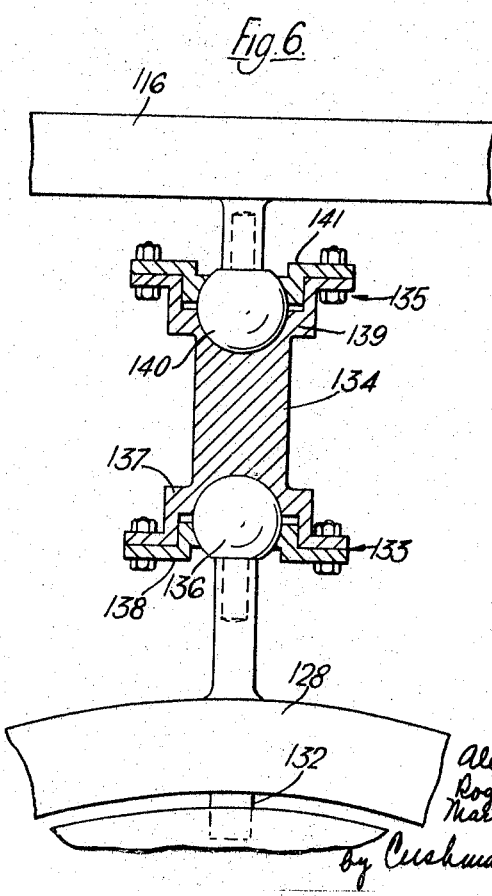

United States Patent Office 3,327,971
Patented June 27, 1967

3,327,971
MOUNTING ARRANGEMENT FOR LIFT ENGINES
Alexander Stewart, Breadsall, Derby, Roger Anthony Cresswell, Derby, and Martin Hume Bryan-Brown, Etwall, England, assignors to Rolls-Royce Limited, Derby, England
Filed June 14, 1965, Ser. No. 463,581
Claims priority, application Great Britain, June 23, 1964, 25,840/64; July 10, 1964, 28,725/64
5 Claims. (Cl. 244—54)

This invention relates to mounting arrangements for engines, and has particular but not exclusive reference to lift engines.

Throughout this specification the term "lift engine" is to be understood to refer to an engine adapted to provide lift forces on an aircraft independent of the lift forces generated by the aerodynamic surfaces of the aircraft.

According to the present invention there is provided an engine having deflector means for its exhaust gases, the deflector means being attached to the engine, and there being mounting means whereby the deflector can be mounted from the structure of an aircraft so that all loads due to the thrust of the engine are transmitted into the aircraft structure by said mounting means which also support a proportion of the weight of the engine, a second mounting means being provided by which the remaining proportion of the weight of the engine may be carried from the aircraft structure.

The second mounting means may be adapted to permit small rotational movements of the engine about its axis.

In a preferred embodiment of the invention the first mounting means comprises one ball and socket joint and one spigot and socket joint, the joints being disposed at each end of a diameter of the deflector or of a supporting ring surrounding the deflector.

In a further embodiment the first mounting means comprises a swinging link which swings in a direction substantially perpendicular to the axis of the engine and which takes all thrust loads and a stay or stays which prevent angular movement of the engine about its axis.

The invention will now be particularly described merely by way of example with reference to the accompanying drawings, in which:

FIGURE 1 shows an aircraft having podded lift engines mounted according to the invention;

FIGURE 2 shows an enlarged and partly broken away part of the pod from the aircraft of FIGURE 1;

FIGURE 3 shows a lift engine as shown in FIGURE 2 but without the surrounding pod structure.

FIGURE 4 is a partly sectional view of the deflector of the engine of FIGURE 3;

FIGURE 5 shows a further embodiment comprising a lift engine with mountings according to the invention;

FIGURE 6 shows a part-section of some of the mounting means for the engine of FIGURE 5;

Referring first to FIGURE 1, a VTOL or STOL aircraft 10 has forward propulsion engines 11 slung from its wings 12, and outboard of these engines 11 are pods 13 also slung from the wings 12.

Each pod comprises a number of lift engines 14 which are disposed substantially horizontally in the pod 13, with their axes perpendicular to the longitudinal axis of the aircraft 10. At the exhaust ends of the engines 14, facing the fuselage of the aircraft 10, are deflectors 15.

These deflectors 15, as can best be seen from the latter figures, comprise a series of vanes which deflect the exhaust from the engines 14 through an angle of 55° in the case of horizontally disposed engines or through such other angle as may be necessary to ensure that the thrust of the engines may be caused to act substantially vertically upwards. Each of the deflectors 15 is rotatable by means not shown about the axis of its respective engine 14 so that the gas from the engines 14 may be deflected forwards of the aircraft to give braking or rearward of the aircraft to accelerate the aircraft during transition from vertical to forward flight. Intermediate positions of the deflectors may be used to provide lift and braking or acceleration.

As may be seen from FIGURE 2, the load-carrying structure of the pods 13 comprises two longitudinal beams 16 and 17 under the top surface of the pod 13. These beams 16 and 17 are attached to the wing structure of the aircraft 10 by means not shown. The beam 17, which is the beam which lies above the exhaust end of the engines 14, has a number of vertical strut members 18 extending downwardly from it and attached rigidly to it. The struts 18 pass one on either side of the deflectors 15 of the engines 14, and each of the deflectors 15 are attached to the adjacent struts 18 by a spigot and socket joint 19 and a ball and socket joint 20.

As can best be seen from FIGURES 3 and 4, the joint 19 comprises a pin 21 attached to a strong ring 22 on the periphery of the deflector 15 and which fits in a cylindrical socket 23 mounted on one strut 18.

The joint 20 comprises a ball 24 attached to the ring 22 which locates in a spherical socket 25 mounted on an adjacent strut 18.

It will be seen that the joints 19 and 20 provide sufficient restraint to enable all thrust loads on the deflector 15 and some of the weight of the engine 14 to be taken into the struts 18 and hence into the structure of the aircraft while enabling radial expansion of the deflector 15 to take place.

The deflector 15 is attached rigidly to the engine 14 by a bolted flange 26 which carries the deflector 15 via a distance piece 27. By this construction there are no parting loads between the deflector 15 and engine 14 to be taken by the aircraft structure.

In order to take the remaining weight of the engine, a yoke 28 is suspended on the beam 16 by a ball and socket joint 29, similar to the joint 20. The ball of this joint is mounted on the yoke 28 and the socket is attached to the beam 16. The yoke 28 has two arms 30 which extend round the casing of the engines 14 and which carry at diametrically opposed points on this casing spigots which engage the cylindrical sockets of spigot and socket joints 31. The cylindrical sockets of the joints 31 are formed in the casing of the engine 14. Thus it will be seen that a proportion of the weight only of the engines 14 is carried via the joints 31, the yoke 28 and the joint 29 into the beam 16 and the aircraft structure. The cylindrical sockets of the joints 31 may be formed as diametrical holes through balls which locate in spherical sockets on the casing of the engines 14. Thus angular misalignments of the spigots of the joints 31 will be allowed for by rotation of these balls in their sockets.

The method of support of the engine 14 by the arms 30 of the yoke 28 ensures that substantially tangential loads only are taken by the casing of the engine 14. This is important in the case of a lift engine where the casing may be thin in order to reduce weight.

It will be seen that the present invention provides a means of mounting the engines 14 whereby thrust loads are taken direct into the engine structure by the joints 19 and 20 from the deflectors 15, no parting loads between the deflectors 15 and engines 14 are transmitted to the aircraft structure, and the engine casing has only to take tangential loads due to a proportion of the weight of the engine alone.

FIGURE 5 shows a further embodiment in which there is a lift engine 114 disposed in a similar fashion to the engines 14 of FIG. 1 and to which an extension piece 127 is attached by a flange 126. The piece 127 carries a deflector 115 which is rotatable about the axis of the engine 114.

A strong ring 122 around the periphery of the deflector 115 carries at diametrically opposed points a ball 124 which forms part of a ball and socket joint and a spigot 121 which forms part of a spigot and socket joint. The socket parts of these joints (not shown) are attached to the structure of the aircraft in which the engine 114 is mounted.

At the forward end of the engine 114 a yoke having arms 130 which extend round the casing of the engine 114 is used to carry the forward part of the engine 114. The arms 130 carry at diametrically opposed points on the casing spigots which engage the cylindrical sockets of spigot and socket joints 131.

A third spigot 132 is carried on the part of the yoke 128 equidistant from the joints 131. This spigot locates on a socket on the engine casing and prevents rotation of the yoke 128 about the axis of the joints 131.

The yoke also carries the ball of a ball and socket joint 133, the socket of which is formed on a link 134.

The link 134 also carries the socket of another ball and socket joint 135. The ball of this joint 135 is attached rigidly to the aircraft structure 116.

Thus it will be seen that the forward part of the engine is supported from the structure 116 in the joints 131, yoke 128, joint 132, link 133 and joint 135.

FIGURE 6 show the link 134, joints 133 and 135, and the adjacent structure of the beam 116 and yoke 128 in greater detail.

The yoke 128 carries a ball 136 which locates in a socket piece 137, the ball 136 being held in the socket 137 by a retainer 138. The socket 137 is formed in one end of the link 134.

The other end of the link carries a socket 139 in which a ball 140 locates, the ball being held in the socket by a retainer 141. The ball 140 is attached to the beam 116 and hence the yoke 128 is attached to this beam.

This arrangement is of use where that part of the structure carrying the joints 124 and 121 may move relative to that part carrying the joints 131 and 132. Thus any small rotation of the engine 114 about its axis may be taken by the corresponding rotation of the link 134. This precludes the engine 114 having torsional stresses set up in its casing which can therefore be made correspondingly thinner.

The present modification may be used with any of the variations of the embodiments described hereinbefore.

It will be noted that the deflector described above comprises a series of vanes set in a plane perpendicular to the engine axis. The deflector could, of course, comprise other forms such as a bend in the exhaust pipe or such a bend combined with a series of deflector vanes.

We claim:

1. An engine mounting installation for aircraft comprising in combination: aircraft load carrying structure; a gas turbine engine including an engine casing; deflector means including an extension, said deflector means being adjustable to deflect exhaust gases from said engine in a desired forwardly, rearwardly or downwardly direction; attachment means for rigidly connecting the extension of said deflector means to the casing of said engine; a first mounting means between said deflector means and said aircraft load carrying structure, said first mounting means including oppositely disposed support means for said deflector means capable of transmitting a portion of the weight of the engine and all of the loads produced by exhaust gases on said deflector means to said aircraft load carrying structure; said oppositely disposed support means of said first mounting means including a first socket, a ball adapted to be received in said first socket, a second socket diametrically opposed to said first socket and a spigot adapted to be received in said second socket, said oppositely disposed support means providing for radial expansion of said deflector means; and a second mounting means between the casing of said engine and said aircraft load carrying structure for transmitting the remaining portion of the weight of said engine to said aircraft load supporting structure, said second mounting means being longitudinally spaced forward of said first mounting means and including at least oppositely disposed support for means for transmitting the remaining weight of said engine tangentially through the engine casing.

2. An engine mounting installation as claimed in claim 1 including means for supporting said ball and spigot on opposite sides of the extension of said deflector means, said last-mentioned means being a ring surrounding said extension.

3. An engine mounting installation as claimed in claim 1 in which said oppositely disposed support means of said second mounting means comprises a yoke having two ends and surrounding a portion of the casing of said engine, said yoke being pivotally attached to said aircraft load carrying support structure, and a socket and a spigot connection between the ends of said yoke and said casing.

4. An engine mounting installation as claimed in claim 3 in which said yoke and said casing includes means intermediate the ends of said yoke for elimination of relative rotation between said yoke and said casing about the ends of said yoke, said last-mentioned means including a spigot and socket operatively carried by said yoke and said casing.

5. An engine mounting installation as claimed in claim 3 in which said yoke is connected to said aircraft load carrying structures by a link, and said link at one end thereof and said aircraft load carrying structure being attached to each other by a ball and socket joint and said link at the other end thereof and said yoke being connected to each other by a second ball and socket joint.

References Cited

UNITED STATES PATENTS

| | | | |
|---|---|---|---|
| 2,529,955 | 11/1950 | Morley | 248—5 |
| 2,833,494 | 5/1958 | Parker et al. | 224—54 X |
| 2,981,501 | 4/1961 | Schaefer | 244—23 X |
| 3,201,070 | 8/1965 | Chilvers | 244—54 |
| 3,241,312 | 3/1966 | Clark | 244—54 X |

FOREIGN PATENTS 588,090 12/1959 Canada.

MILTON BUCHLER, *Primary Examiner.*

FERGUS S. MIDDLETON, *Examiner.*

B. BELKIN, *Assistant Examiner.*